April 5, 1949.  S. E. MILAN  2,466,179

PIPE CUTTING TOOL

Filed Dec. 13, 1947

INVENTOR
STANLEY E. MILAN

BY

ATTORNEYS

Patented Apr. 5, 1949

2,466,179

UNITED STATES PATENT OFFICE 2,466,179

PIPE CUTTING TOOL

Stanley E. Milan, Milwaukee, Wis.

Application December 13, 1947, Serial No. 791,603

2 Claims. (Cl. 30—102)

My invention refers to pipe cutting tools. The object of my invention is to provide a simple and durable hand actuated pipe cutting tool, to be adjustably clamped upon a pipe for cutting the same into pre-determined lengths. The tool is provided with a traction driven cutting wheel, carried by a head, whereby gripping jaws of the device are adapted to clamp the pipe to cause the cutting wheel to bite into the same, and thereafter, the tool is manually rotated for initially cutting a groove therein, followed by successive tightening of the jaws upon the pipe, causing the cutting wheel, which will revolve in the initial groove to finally sever said pipe.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 3:
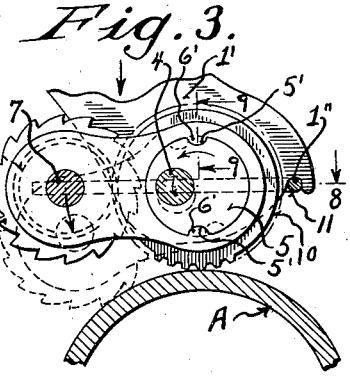
Figure 3 is an enlarged fragmentary sectional elevation of the cutting mechanism engaging a pipe section preparatory to a final clamping operation, the section being indicated by line 3—3 of Figures 4 and 8.

Referring by characters to the drawing, 1 indicates a hollow head having jaw wings 1' extending therefrom, between which gear cutting mechanism, to be hereinafter described, is nested. Diametrically opposite the cutting jam mechanism, is positioned a clamping jaw 2 carrying rollers 2' for engagement with a pipe A. The upper end of the clamping jaw terminates with a toothed shank 2'', the same being rectangularly in cross section and slidable in the head 1.

Figure 1:
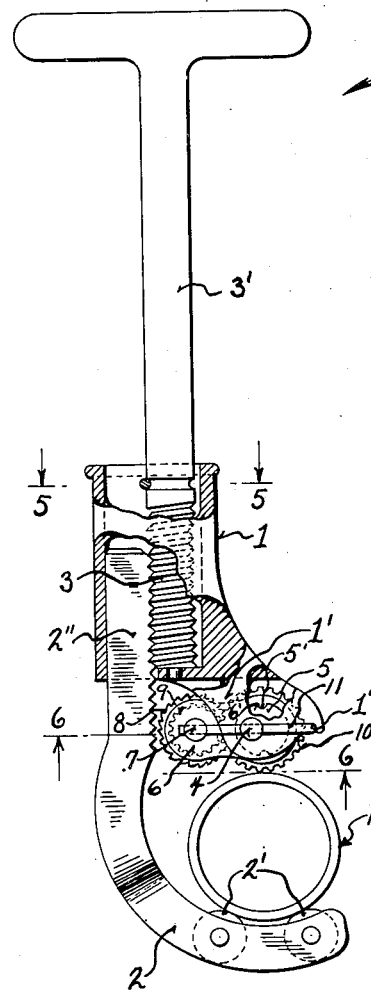
Figure 1 is a face view of a pipe cutting tool embodying the features of my invention with parts broken away and in section to more clearly illustrate structural features.
Figure 5:
Figure 5 is a cross sectional plan view of the head portion of said tool, the section being indicated by line 5—5 of Figure 1.

As best indicated in Figures 1 and 5, the head has rotatably mounted therein the lower threaded end 3 of a handle 3', the said lower end being in meshed engagement with the toothed shank of the clamping jaw.

Figure 8:
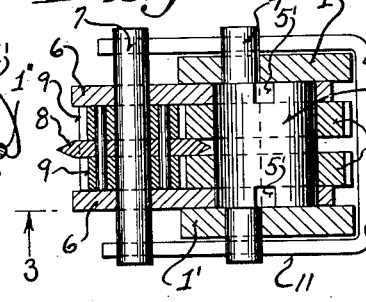
Figure 8 is a sectional plan elevation of said cutting mechanism, the section being indicated by line 8—8 of Figure 3.

The jaw wings 1' of the head have mounted therein a shaft 4 and said shaft has loosely mounted thereon a cylindrical eccentric barrel 5, the ends of which abut the wings 1', and said ends are provided with sockets 5', as best indicated in Figures 3 and 8 of the drawings.

Mounted upon the ends of the barrel 5 are companion arms 6—6 which are keyed to said barrel by shoulders 6', which shoulders engage the sockets 5', it being understood that the arms extend a pre-determined distance beyond the coupling connection with reference to the barrel and head wings.

The outer free ends of the arms 6 are connected by a stud shaft 7, the ends of which stud project beyond the arms, as best shown in Figure 8 of the drawing.

Loosely mounted upon the stud 7 is a saw toothed cutting wheel 8, which wheel has secured thereto by pins a pair of tooth pinions 9.

Figure 4:
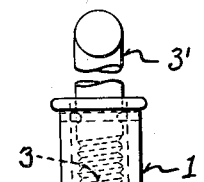
Figure 4 is a side elevation of the tool.
Figure 6:
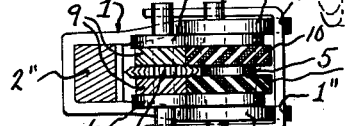
Figure 6 is a sectional, inverted plan view through the tool illustrating the cutting mechanism, the section being indicated by line 6—6 of Figure 1.
Figure 9:
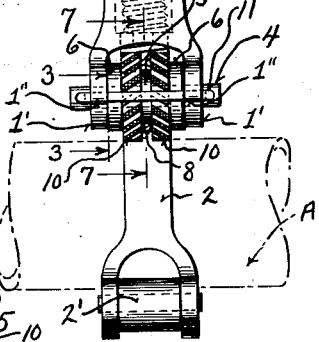
Figure 9 is a detail, sectional view illustrating the lock connection between the eccentric barrel and one of the cutter carrying arms.
Figure 7:
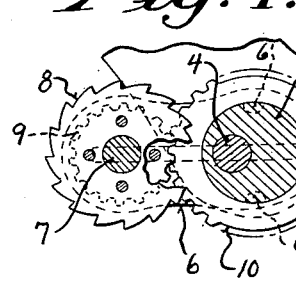
Figure 7 is a detail face view of the cutting mechanism, the same being in section as indicated by line 7—7 of Figure 4.

The tooth pinions 9 mesh with gear wheels 10 that are loosely mounted upon the cylindrical barrel 5. The faces of the gear wheel teeth are preferably obliquely disposed and knurled to present a traction surface for engagement with the outer face of the tube A, as best indicated in Figures 4 and 6 of the drawings.

In order to hold the cutting mechanism in its idle position, as shown in Figures 1 and 3 of the drawings, I provide a U-shaped spring 11. The base of the spring is nested in notches 1'' of the jaw wings 1' and the legs of said spring are extended through apertures in the shaft 4 and stud 7 of the cutting mechanism, whereby said mechanism is held in its idle position.

When it is desired to cut a tube or pipe A, as best shown in Figures 1 and 3 of the drawing, the jaws are fitted to the pipe by a three point connection, wherein the gear wheels 11 engage the surface of the pipe in conjunction with the anti-friction rollers 2' of the lower gripping jaw.

The above position is obtained by rotating the handle 3', whereby its threaded connection between the bottom of said handle and jaw shank 2" will draw these three elements against the pipe.

Figure 2:
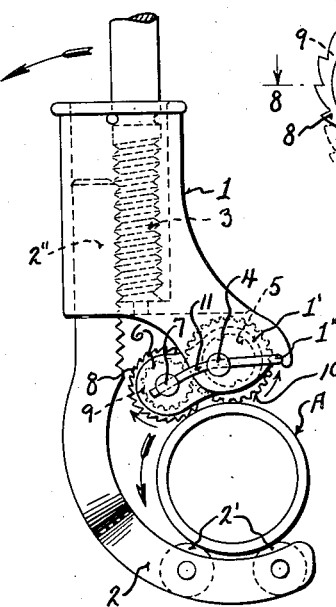
Figure 2 is a similar view illustrating jaws of the tool tightly clamping a pipe preparatory to cutting the same.

To effect a cutting operation, the handle 3' is thereafter rotated to exert cutting pressure upon said pipe, whereby the barrel carried shaft 4 will cause said barrel to rotate in the direction, as indicated by the arrow in Figure 3, to thus bow the legs of the spring 11 downwardly, whereby the cutting wheel will exert a cutting pressure upon the tube A, as indicated in Figure 2 of the drawings.

The tool is then manually operated by rotating the handle, as indicated by the arrow in Figure 3 of the drawing. This rotation will cause the saw toothed wheel 8 to cut a groove in the pipe, which groove is successfully deepened by revolving the handle, which handle is continued in its rotation, about the tube to finally completely sever the same.

Thus, it will be noted that a pipe may be cut into pre-determined lengths by a simple manual operation, keeping in mind that the traction of the gear wheels 10 will cause rapid rotation of the cutting wheel, through the meshed engagement with the cutting wheel pinions.

I claim:

1. A pipe cutting tool comprising a head having a cutting jaw extending therefrom, an opposed gripping jaw having a toothed shank slidable in the head, a handle extending upwardly from the head having a threaded end mounted in said head engaging the toothed shank of the gripping jaw, arms pivotally mounted in the head jaw, traction gear wheels loosely mounted upon the arm pivot, a stud carried by the arms, a cutting wheel mounted upon the stud, and pinions carried by the cutting wheel in meshed engagement with the traction gear wheels.

2. A pipe cutter comprising a pair of jaws, means for relative adjustment between the jaws, a shaft mounted in one of the jaws, a cylindrical barrel eccentrically mounted upon the shaft, arms fixedly secured to the barrel ends, a stud extending through the free ends of the arms, a saw toothed cutting wheel mounted upon the stud, traction gear wheels loosely mounted upon the barrel in gear connection with the cutting wheel, and a spring connecting the jaw, stud and shaft.

STANLEY E. MILAN.

No references cited.